United States Patent
Bond

(10) Patent No.: US 9,816,279 B2
(45) Date of Patent: Nov. 14, 2017

(54) STANDING SEAM MOUNTING BRACKETS

(71) Applicant: Scott G. Bond, Winslow, ME (US)

(72) Inventor: Scott G. Bond, Winslow, ME (US)

( * ) Notice: Subject to any disclaimer, the term of this patent is extended or adjusted under 35 U.S.C. 154(b) by 0 days.

(21) Appl. No.: 15/014,311

(22) Filed: Feb. 3, 2016

(65) Prior Publication Data

US 2016/0222670 A1 Aug. 4, 2016

Related U.S. Application Data

(60) Provisional application No. 62/111,450, filed on Feb. 3, 2015.

(51) Int. Cl.
*E04G 3/26* (2006.01)
*F16M 13/02* (2006.01)
*F24J 2/52* (2006.01)
*E04D 13/10* (2006.01)
*E06C 1/34* (2006.01)
*E04G 21/32* (2006.01)
*E04G 5/04* (2006.01)
*E06C 7/18* (2006.01)

(52) U.S. Cl.
CPC ............... *E04G 3/26* (2013.01); *E04D 13/10* (2013.01); *E04G 5/041* (2013.01); *E04G 21/3285* (2013.01); *E06C 1/345* (2013.01); *E06C 7/188* (2013.01); *F16M 13/02* (2013.01); *F24J 2/5249* (2013.01)

(58) Field of Classification Search
CPC ....... E04G 3/26; E04G 5/041; E04G 21/3285; E06C 1/345; E06C 7/188; E04D 13/10; F24J 2/5249; F16M 13/02

USPC ............................................. 248/237; 182/45
See application file for complete search history.

(56) References Cited

U.S. PATENT DOCUMENTS

| 713,061 | A | * | 11/1902 | Clum | E04G 3/26 |
| | | | | | 248/237 |
| 1,054,091 | A | * | 2/1913 | Darnall | E04D 13/10 |
| | | | | | 248/237 |
| 2,329,415 | A | * | 9/1943 | Osborne | E04G 3/26 |
| | | | | | 182/113 |
| 2,729,517 | A | * | 1/1956 | Hamilton, Sr. | E04G 3/26 |
| | | | | | 182/45 |
| 3,880,405 | A | * | 4/1975 | Brueske | E04G 21/3214 |
| | | | | | 182/113 |
| 4,856,745 | A | * | 8/1989 | Mabie | E04G 3/26 |
| | | | | | 182/45 |

(Continued)

FOREIGN PATENT DOCUMENTS

| DE | 9112788 U1 * 12/1991 | ............. E04D 13/10 |
| DE | 9112966 U1 * 12/1991 | ............. E04D 13/10 |

(Continued)

*Primary Examiner* — Eret McNichols
(74) *Attorney, Agent, or Firm* — Pierce Atwood LLP

(57) ABSTRACT

A standing seam mounting bracket and a method of using two or three to provide attachment points along a standing seam roof is provided. The standing seam mounting brackets enable complementary use of commonly-owned equipment for enabling roof maintenance and construction. The standing seam mounting brackets may be used in concert with roof jacks, roof ladders, scaffolding members and the like that are commonly owned by most contractors so as to facilitate safe and easy horizontal and vertical movement along the sloped roof.

12 Claims, 4 Drawing Sheets

(56) References Cited

U.S. PATENT DOCUMENTS

| | | | | |
|---|---|---|---|---|
| 4,884,775 A * | 12/1989 | Fischer, Jr. | ............... | E04G 3/26 182/45 |
| 5,113,971 A * | 5/1992 | Violet | ............... | E04G 3/26 182/45 |
| 5,222,340 A * | 6/1993 | Bellem | ............... | E04D 3/364 403/380 |
| 5,513,826 A * | 5/1996 | Lebaron | ............... | E04G 3/26 182/45 |
| 5,609,326 A * | 3/1997 | Stearns | ............... | E04D 13/10 182/45 |
| 5,613,328 A * | 3/1997 | Alley | ............... | E04D 13/10 52/24 |
| 5,647,451 A * | 7/1997 | Reichel | ............... | E04G 21/3214 182/113 |
| 5,732,918 A * | 3/1998 | Steele | ............... | E04G 3/26 248/237 |
| D404,151 S * | 1/1999 | Reichel | ............... | D25/131 |
| 6,105,718 A * | 8/2000 | Stewart | ............... | E04D 13/12 182/100 |
| 6,318,028 B2 * | 11/2001 | Alley | ............... | E04D 13/10 411/432 |
| 6,526,701 B2 * | 3/2003 | Stearns | ............... | E04D 13/10 248/237 |
| 6,536,166 B1 * | 3/2003 | Alley | ............... | E04D 13/10 411/432 |
| 6,688,047 B1 * | 2/2004 | McNichol | ............... | E04D 13/10 52/25 |
| 7,036,629 B2 * | 5/2006 | Nicolaysen | ............... | E04G 3/26 182/45 |
| 7,568,671 B2 * | 8/2009 | Lallier | ............... | E04G 3/26 182/45 |
| 8,025,126 B1 * | 9/2011 | Lefavor | ............... | E04G 3/26 182/45 |
| 8,225,904 B2 * | 7/2012 | Davis | ............... | E04G 3/26 182/150 |
| 8,251,326 B2 * | 8/2012 | McPheeters | ............... | E04D 13/1476 248/222.13 |
| 8,448,746 B2 * | 5/2013 | Davis, Jr. | ............... | E04D 15/00 182/45 |
| 8,607,507 B2 * | 12/2013 | Anderson | ............... | E04D 3/362 248/535 |
| 8,732,917 B2 * | 5/2014 | Zeilenga | ............... | F24J 2/5249 24/514 |
| 9,145,694 B2 * | 9/2015 | Bulley | ............... | E04G 3/20 |
| 9,493,955 B1 * | 11/2016 | Christian | ............... | F24J 2/5249 |
| 2005/0247518 A1 * | 11/2005 | Klein | ............... | E04G 21/3219 182/45 |
| 2007/0090232 A1 * | 4/2007 | Cantis | ............... | E04G 3/26 248/121 |
| 2010/0058701 A1 * | 3/2010 | Yao | ............... | E04D 13/12 52/547 |
| 2010/0171016 A1 * | 7/2010 | Haddock | ............... | E04D 13/10 248/237 |
| 2011/0203220 A1 * | 8/2011 | Bronkhorst | ............... | E04G 3/26 52/747.1 |
| 2012/0032045 A1 * | 2/2012 | Lallier | ............... | E04G 3/26 248/237 |
| 2013/0313043 A1 * | 11/2013 | Lallier | ............... | E04G 3/265 182/45 |
| 2015/0060620 A1 * | 3/2015 | Smeja | ............... | E04D 13/00 248/237 |
| 2015/0365044 A1 * | 12/2015 | McPheeters | ............... | E04D 13/1476 248/237 |
| 2016/0177583 A1 * | 6/2016 | Kurtz | ............... | E04G 3/20 182/45 |

FOREIGN PATENT DOCUMENTS

| | | | | |
|---|---|---|---|---|
| DE | 9103193 U1 * | 7/1992 | ............... | E04D 13/10 |
| JP | 3146181 B2 * | 3/2001 | ............... | F24J 2/5249 |
| JP | 3258613 B2 * | 2/2002 | ............... | F24J 2/5249 |
| WO | WO 2014087437 A1 * | 6/2014 | ............... | E04G 21/3285 |

* cited by examiner

STANDING SEAM MOUNTING BRACKETS

CROSS-REFERENCE TO RELATED APPLICATION

This application claims the benefit of priority of U.S. provisional application No. 62/111,450, filed 3 Feb. 2015, the contents of which are herein incorporated by reference.

BACKGROUND OF THE INVENTION

The present invention relates to roofing equipment and, more particularly, to a standing seam mounting bracket and a method of using two or three to provide attachment points along a standing seam roof, thereby enabling complementary use of commonly-owned roof equipment thereon. The standing seam mounting brackets may be used in concert with roof jacks, roof ladders, scaffolding members and the like that are commonly owned by most contractors so as to facilitate safe and easy horizontal and vertical movement along the sloped roof.

Standing seam metal roofs are slippery and dangerous if someone needs for any reason to stand on that surface to perform their duty. This duty would typically be on-going maintenance or additional work on the structure.

Current devices for enabling a craftsman to stand on a standing seem roof are complicated and therefore very expensive. Other similar brackets require the installation of many multiples of those brackets to work effectively but at great cost. Moreover, vertical movement on the roof is almost impossible with these current devices geared mainly for plank support. Accordingly, many consumers or small business owners will then rather field-improvise at great risk to themselves and their workers.

As can be seen, there is a need for a standing seam mounting brackets that are easily installed in two or three attachment points for enabling complementary use of commonly-owned roof equipment for facilitating safe and easy horizontal and vertical movement along the sloped roof.

SUMMARY OF THE INVENTION

In one aspect of the present invention, a standing seam mounting bracket includes a planar base providing a front surface and an opposing rear surface, each surface extending from a first end to a second end; a first flange perpendicularly joined to the planar base along the first end; a cross member slot extending from the first end toward the second end, wherein the cross member slot is dimensioned to slidably receive at least a 2×4 cross member; and at least one compression member adapted to removably sandwich a mated portion of a standing seam roof between the planar base.

In another aspect of the present invention, A standing seam mounting bracket includes a planar base providing a front surface and an opposing rear surface, each surface extending from a first end to a second end; a first flange perpendicularly joined to the planar base along the first end, wherein the first flange provides a plurality of attachment holes, and wherein the first flange extends from the front surface; a cross member slot extending from the first end toward the second end, wherein the cross member slot is dimensioned to slidably receive at least a 2×4 cross member; at least one compression member adapted to removably sandwich a mated portion of a standing seam roof between the planar base, and wherein each compression member provides a crimp slot dimensioned and adapted for nesting a crimp portion of the sandwiched mated portion of the standing seam roof; a second flange perpendicularly joined to the planar base along the second end, wherein the second flange extends from the rear surface; a seam slot is provided in the second flange, wherein the seam slot is dimensioned to slidably receive the mated portion; a foot flange perpendicularly joined to a bottom portion of the second flange; and a bottom flange perpendicularly joined to a bottom portion of the planar base so that the bottom flange and the second flange are co-planar, and wherein the bottom flange extends from the front surface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a standing seam mounting bracket and a method of using two or three to provide attachment points along a standing seam roof, thereby enabling complementary use of commonly-owned roof equipment thereon. The standing seam mounting brackets may be used in concert with roof jacks, roof ladders, scaffolding members and the like that are commonly owned by most contractors so as to facilitate safe and easy horizontal and vertical movement along the sloped roof.

Figure 1:
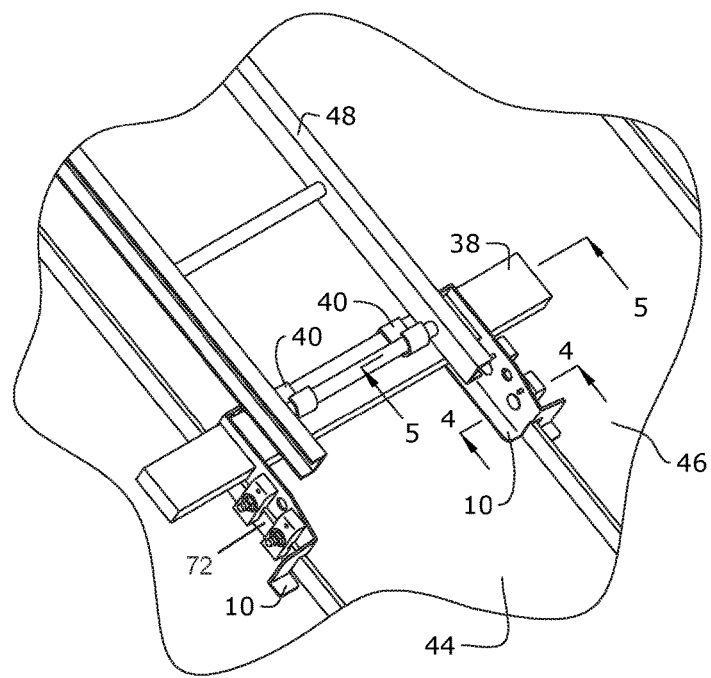
FIG. 1 is a perspective view of an exemplary embodiment of the present invention, shown in use.
Figure 2:
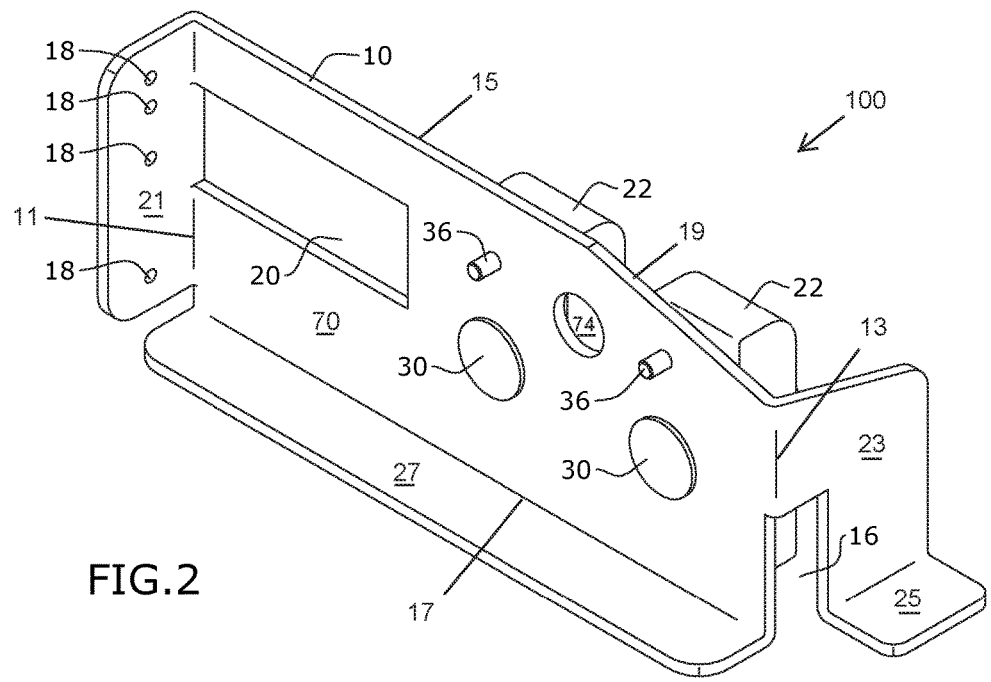
FIG. 2 is a perspective view of an exemplary embodiment of the present invention.
Figure 3:
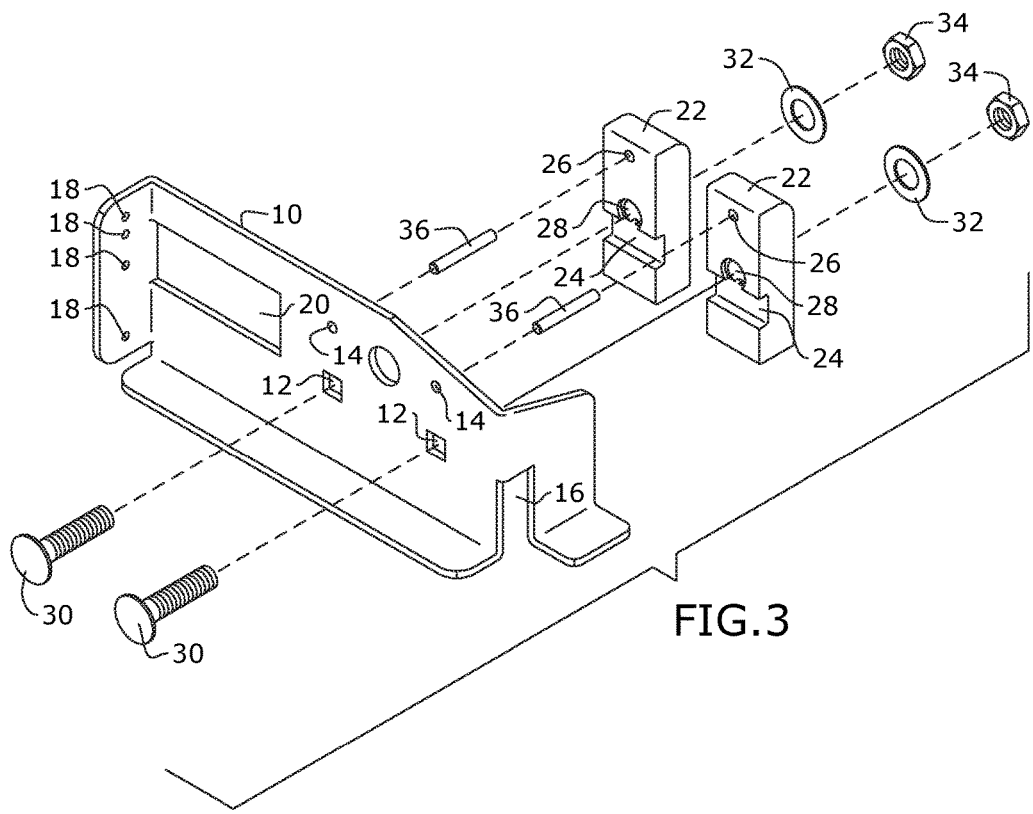
FIG. 3 is an exploded view of an exemplary embodiment of the present invention.

Referring to FIGS. 1 through 8, the present invention may include a standing seam mounting bracket 100. The standing seam mounting bracket 100 may include a planar base 10 having a generally rectangular shape as it extends along its longitudinal axis from a first end 11 to a second end 13, as illustrated in FIG. 2. The planar base 10 is defined further by a top side 15, a bottom side 17, and a front surface 70, also illustrated in FIG. 2. A rear surface 72, opposite the front surface, is illustrated in FIG. 1.

It being understood that the use of the term 'bottom' is associated with the portion or side of the mounting bracket 100 that engages the roof 68, the term 'top' being associated with the opposing portion or side of the mounting bracket 100.

In certain embodiments, as the top side 15 extends to the second end 13, the top side 15 may provide a taper 19 wherein a distance between the top side 15 and the bottom side 17 decreases as the taper 19 approaches the second end 13.

A first flange 21 may be perpendicularly joined to the planar base 10 along its first end 11, as illustrated in FIG. 2, so as to extend frontwards. It being understood that terms rooted in 'front' are associated with the front surface 70, while terms rooted in 'rear' are associated with the rear surface 72. A plurality of attachment holes 18 may be provided in the first flange 21.

A second flange 23 may be perpendicularly joined to the planar base 10 along its second end 13 so as to extend rearwards, in the opposite direction of the first flange 21. A seam slot 16 may be formed between the second flange 23 and the second end 13, as illustrated in FIG. 2. The seam slot 16 is dimensioned and adapted to slidably receive the mated portion of adjacent standing seam roof panels 44 and 46 ("the seam"), as illustrated in FIGS. 1 and 4-8. A foot flange 25 may be perpendicularly joined to the second flange 23, from a bottom portion thereof.

A bottom flange 27 may be perpendicularly joined to the planar base 10 along its bottom side 17 so as to extend frontwards. The bottom flange 27 and the foot flange 25 being generally co-planar, thereby providing stability on opposing sides of the planar base, when in use.

A cross member slot 20 is provided in the planar base 10, wherein the cross member slot 20 extends from the first end 11. The cross member slot 20 may be dimensioned to at least slidably receive a 2×4 lumber member or similarly sized cross members 38.

Offset from the cross member slot 20 in the direction of the second end 13, a spaced apart pair of bolt and roll pin holes 12 and 14, respectively, may be provided. Between the spaced apart pair of bolt and roll pin holes 12 and 14, a rope aperture 74 may be provided.

Figure 4:
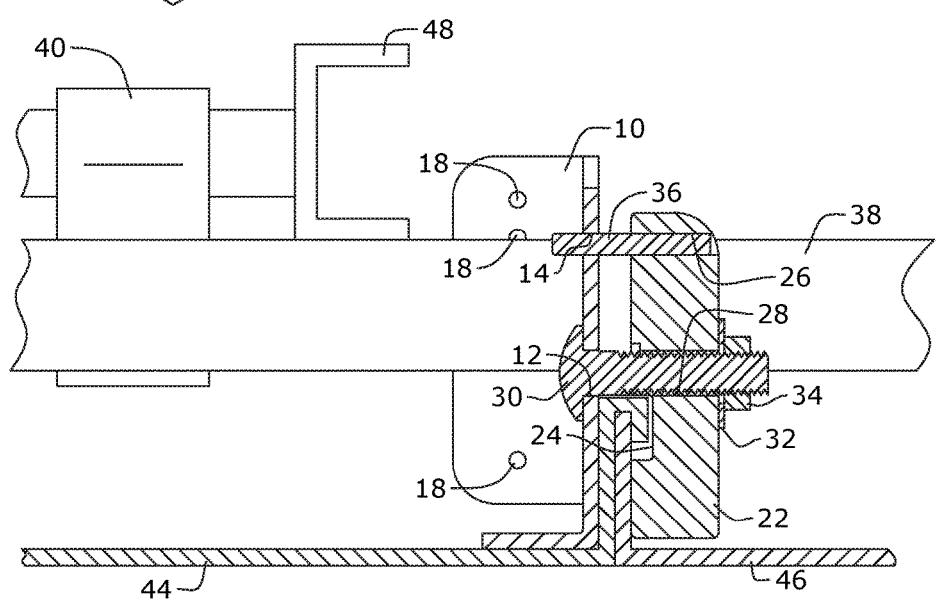
FIG. 4 is a section view of an exemplary embodiment of the present invention, taken along line 4-4 of FIG. 1, shown in use.
Figure 5:
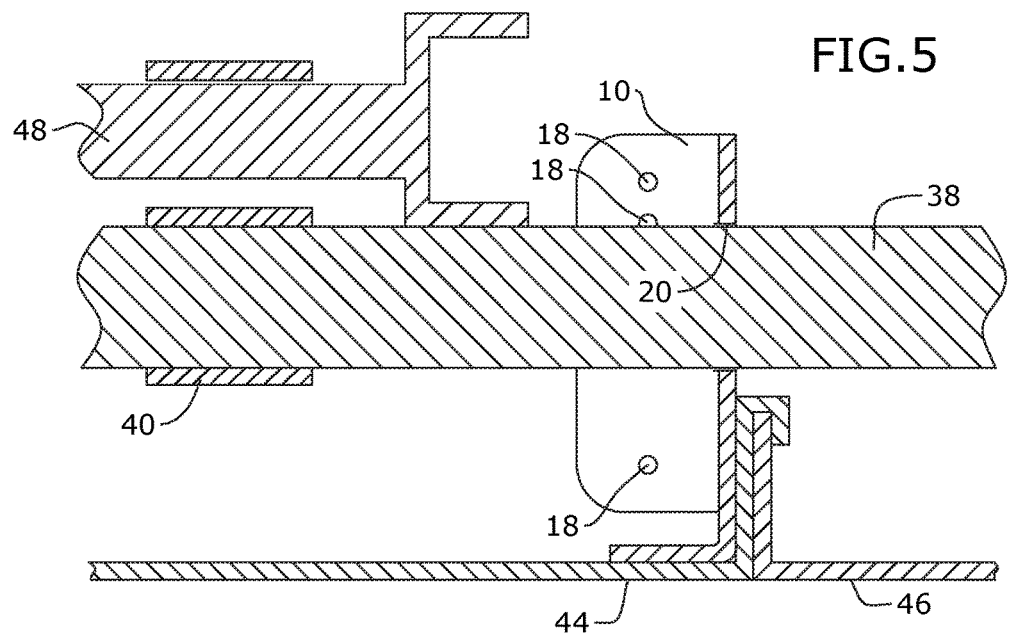
FIG. 5 is a section view of an exemplary embodiment of the present invention, taken along line 5-5 of FIG. 1, shown in use.

Referring to FIG. 4, the bolt and roll pin holes 12 and 14 are dimensioned and adapted to operably receive first sides of carriage bolts 30 and roll pins 36, respectively, so that opposing second sides of the carriage bolts 30 and the roll pins 36 operably engage at least one compression member 22. Each compression member 22 may provide a roll pin slot 26, a bolt hole 28, washers 32 and nuts 34 for such operative engagement. When properly operatively engaged, the compression member 22 are adapted to clamp the mated portion of adjacent standing seam roof panels 44 and 46, which are sandwiched between the compression member 22 and the standing seam mounting bracket 100. The compression member 22 may provide a crimp slot 24 so that a crimped portion of the mated portion of standing seam roof panels 44 and 46 may nest therein during use of the present invention, whereby the crimped portion is not subject to compressive forces. The washers 32, nuts 34, carriage bolts 30 the roll pins 36, or other suitable detachable fasteners enable easy and multiple reattachments with little deformity over time.

Figure 8:
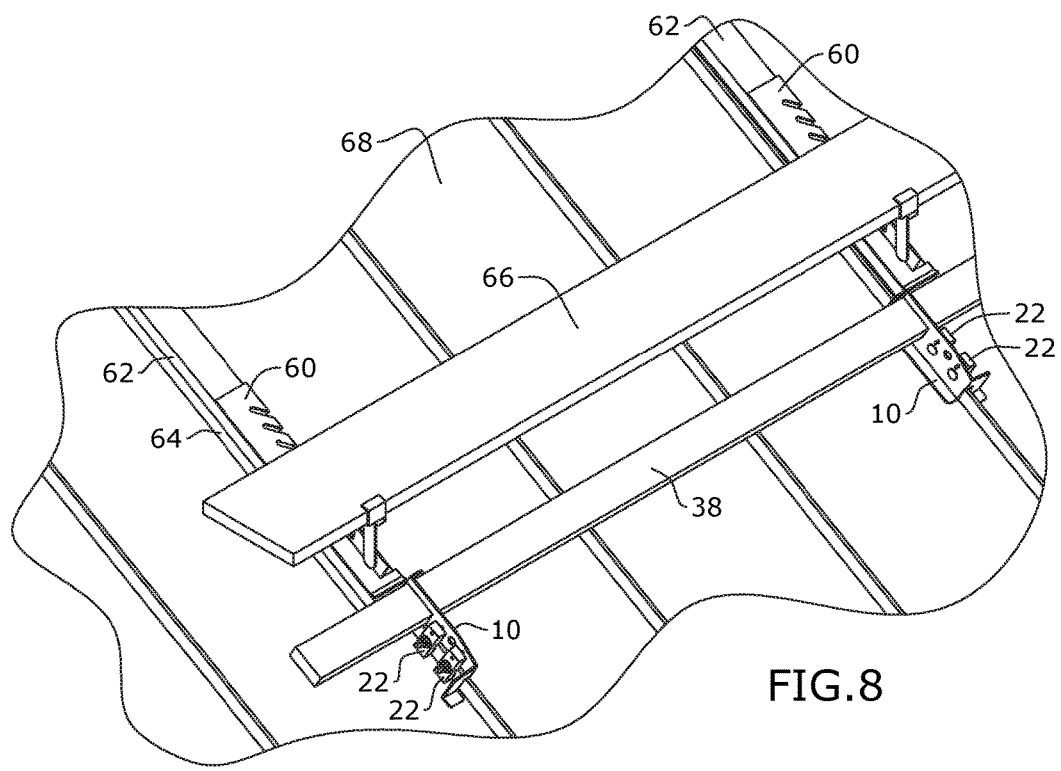
FIG. 8 is a perspective view of an exemplary embodiment of the present invention, shown in use.

A method of using the present invention may include the following. The standing seam mounting bracket 100 disclosed above may be provided. A user may attach a series of two or three brackets 100 to the edge of a standing seam roof 68 prior to making any attempt to stand on that same roof 68. This will most often be done while standing on a ladder leaned against the roof edge from the ground. Once the carriage bolts 30 have been tightened then either a cross member 38 is slid in place or vertical wood members 50, 62, 64 are slid up the roof slope and attached at the first flanges 21 provided (via the attachment holes 18). If only vertical movement is required for the task at hand a 1-piece ladder can then be slid up the slope of the roof and secured at the cross member 38 or clipped in place with an optional ladder rung clip 40, as illustrated in FIG. 1. If horizontal movement is required on roof then a series of common roof jacks 60 and scaffold planks 66 can be attached to the vertical framing members 50, 62, 64 as often as needed, as illustrated in FIG. 8.

Figure 6:
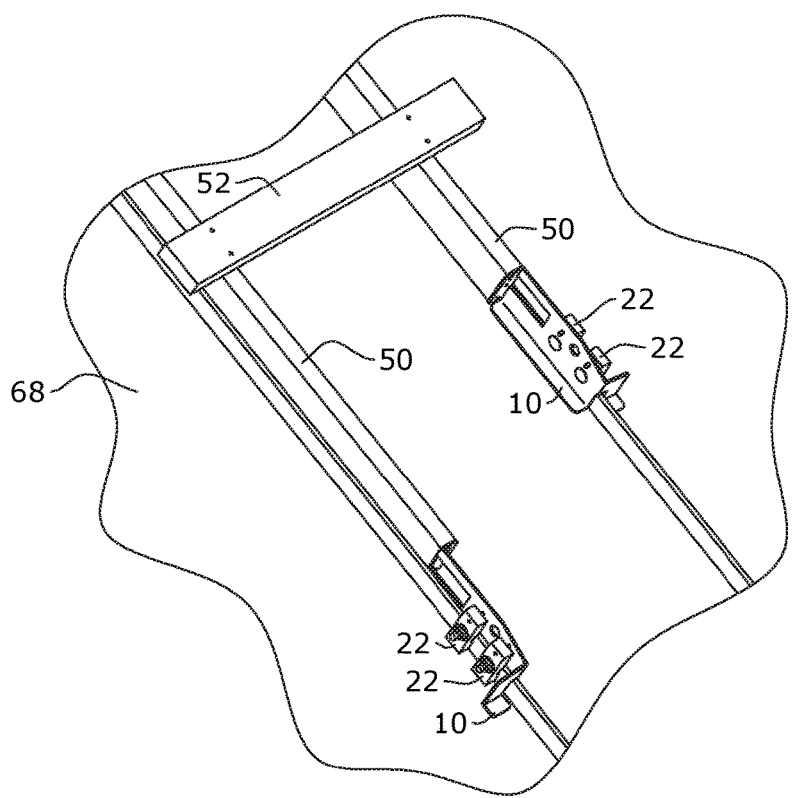
FIG. 6 is a perspective view of an exemplary embodiment of the present invention, shown in use.

The standing seam mounting bracket 100 is adapted to provide a secure point of attachment on a standing seam roof 68 as a starting point for several other common components any tradesman or homeowner will likely have or can easily acquire. These additional common items are necessary for full functionality of this bracket system as intended. By installing at least two brackets 100 on either adjacent seams or any two seams within approximately three feet of each other (generally parallel to the roof eave and approximately 12-18" above the drip line) a cross member 38 can then be inserted through the cross member holes 20 of the aligned brackets 100. This cross member 38 may serve as both foothold and/or horizontal support for a common ladder section 48 placed above and on the roof surface. There may be times when the ladder 48 is placed over the top of the 2×4 and secured with a ladder rung clip 40, enabling the projection of the ladder up the roof to be adjusted as needed, as illustrated in FIG. 1. A 2×4 or 2×6 vertical wood, or other vertical framing members 50, 62, 64 can be secured lain flat on the roof 68 and against the cross member 38 or on edge at the first flange 21, as illustrated in FIG. 6. Various configurations of field-built scaffold and plank supports 52, 66 can then be safely attached to the vertical framing members 50, 62, 64 through the use of rook jacks 60 and the like.

Figure 7:
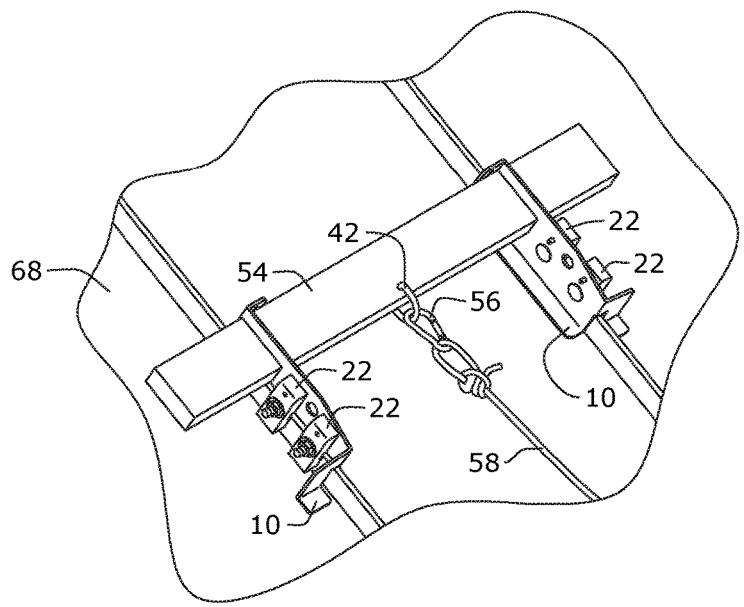
FIG. 7 is a perspective view of an exemplary embodiment of the present invention, shown in use.

In certain embodiments, a steel cross member 54 may be slid into the cross member holes 20, wherein the steel cross member 54 provides a d-ring 42 that a carabineer 56 and rope 58 may engage, as illustrated in FIG. 7, so that the brackets 100 may also be used for safety line attachment, certain firefighting procedures, and possible attachment of various solar energy products. This list is only limited by the creativity of the user.

It should be understood, of course, that the foregoing relates to exemplary embodiments of the invention and that modifications may be made without departing from the spirit and scope of the invention as set forth in the following claims.

What is claimed is:

1. A standing seam mounting bracket, comprising:
a planar base providing a front surface and an opposing rear surface, each surface extending from a first end to a second end;
a first flange perpendicularly joined to the planar base along the first end, wherein the first flange extends from the front surface;
a cross member slot in the planar base, wherein the cross member slot is dimensioned to slidably receive a cross member;
at least one compression member adapted to removably sandwich a mated portion of a standing seam roof between the at least one compression member and the planar base;
a second flange perpendicularly joined to the planar base along the second end, wherein the second flange extends from the rear surface; and a seam slot in the second flange, wherein the seam slot is dimensioned to slidably receive the mated portion; a foot flange perpendicularly joined to a bottom portion of the first flange; and a bottom flange perpendicularly joined to a bottom portion of the planar base so that the bottom flange and the foot flange are co-planar.

2. The standing seam mounting bracket of claim 1, wherein the at least one compression member includes a crimp slot dimensioned and adapted for nesting a crimp portion of the sandwiched mated portion of the standing seam roof.

3. The standing seam mounting bracket of claim 1, further comprising a plurality of attachment holes in the first flange.

4. The standing seam mounting bracket of claim 1, further comprising a foot flange perpendicularly joined to a bottom portion of the second flange.

5. The standing seam mounting bracket of claim 4, further comprising a bottom flange perpendicularly joined to a bottom portion of the planar base so that the bottom flange and the foot flange are co-planar, and wherein the bottom flange extends from the front surface.

6. The standing seam mounting bracket of claim 1, wherein the cross member slot extends from the first end toward the second end.

7. A standing seam mounting bracket, comprising:
a planar base providing a front surface and an opposing rear surface, each surface extending from a first end to a second end;
a first flange perpendicularly joined to the planar base along the first end, wherein the first flange provides a plurality of attachment holes, and wherein the first flange extends from the front surface;
a cross member slot in the planar base, wherein the cross member slot is dimensioned to slidably receive a cross member;
at least one compression member adapted to removably sandwich a mated portion of a standing seam roof between the at least one compression member and the planar base, wherein the at least one compression member includes a crimp slot dimensioned and adapted for nesting a crimp portion of the sandwiched mated portion of the standing seam roof;
a second flange perpendicularly joined to the planar base along the second end, wherein the second flange extends from the rear surface;
a seam slot in the second flange, wherein the seam slot is dimensioned to slidably receive the mated portion;
a foot flange perpendicularly joined to a bottom portion of the second flange, and
a bottom flange perpendicularly joined to a bottom portion of the planar base so that the bottom flange and the foot flange are co-planar, and wherein the bottom flange extends from the front surface.

8. The standing seam mounting bracket of claim 7, wherein the cross member slot extends from the first end toward the second end.

9. A standing seam mounting bracket, comprising:
a planar base providing a front surface and an opposing rear surface, each surface extending from a first end to a second end;
a cross member slot in the planar base, wherein the cross member slot is dimensioned to slidably receive a cross member;
at least one compression member adapted to removably sandwich a mated portion of a standing seam roof between the at least one compression member and the planar base;
a first flange perpendicularly joined to the planar base along the second end; and
a seam slot in the first flange, wherein the seam slot is dimensioned to slidably receive the mated portion.

10. The standing seam mounting bracket of claim 9, wherein the at least one compression member includes a crimp slot dimensioned and adapted for nesting a crimp portion of the sandwiched mated portion of the standing seam roof.

11. The standing seam mounting bracket of claim 9, wherein the bottom flange extends from the front surface and the first flange extends from the rear surface.

12. The standing seam mounting bracket of claim 9, wherein the cross member slot extends from the first end toward the second end.

* * * * *

UNITED STATES PATENT AND TRADEMARK OFFICE
CERTIFICATE OF CORRECTION

PATENT NO. : 9,816,279 B2
APPLICATION NO. : 15/014311
DATED : November 14, 2017
INVENTOR(S) : Scott G. Bond It is certified that error appears in the above-identified patent and that said Letters Patent is hereby corrected as shown below:

In the Claims

Column 5, Lines 2-6, in Claim 1, delete "; a foot flange perpendicularly joined to a bottom portion of the first flange; and a bottom flange perpendicularly joined to a bottom portion of the planar base so that the bottom flange and the foot flange are co-planar".

Column 6, Line 29, in Claim 9, replace "the mated portion" with --the mated portion; a foot flange perpendicularly joined to a bottom portion of the first flange; and a bottom flange perpendicularly joined to a bottom portion of the planar base so that the bottom flange and the foot flange are co-planar--.

Signed and Sealed this
Thirteenth Day of February, 2018

Andrei Iancu
*Director of the United States Patent and Trademark Office*